(12) United States Patent
Kulm

(10) Patent No.: US 9,085,914 B1
(45) Date of Patent: Jul. 21, 2015

(54) BLIND ASSEMBLY

(71) Applicant: Gerald Wayne Kulm, Saratoga, CA (US)

(72) Inventor: Gerald Wayne Kulm, Saratoga, CA (US)

( * ) Notice: Subject to any disclaimer, the term of this patent is extended or adjusted under 35 U.S.C. 154(b) by 0 days.

(21) Appl. No.: 14/498,854

(22) Filed: Sep. 26, 2014

Related U.S. Application Data

(60) Provisional application No. 61/883,776, filed on Sep. 27, 2013.

(51) Int. Cl.
| | |
|---|---|
| *A01M 31/00* | (2006.01) |
| *E04H 15/00* | (2006.01) |
| *E04H 15/34* | (2006.01) |
| *E04H 15/48* | (2006.01) |
| *A01M 31/02* | (2006.01) |

(52) U.S. Cl.
CPC ............ *E04H 15/001* (2013.01); *A01M 31/025* (2013.01); *E04H 15/34* (2013.01); *E04H 15/48* (2013.01)

(58) Field of Classification Search
CPC ......... E04H 15/00; E04H 15/48; E04H 15/01; E04H 15/34; A01M 31/025
USPC ........ 135/901, 913, 123, 143, 151, 20.1; 43/1
See application file for complete search history.

(56) References Cited

U.S. PATENT DOCUMENTS

| | | | | | |
|---|---|---|---|---|---|
| 225,372 | A | * | 3/1880 | Herbert | 135/155 |
| 1,281,691 | A | * | 10/1918 | Stockwell | 135/143 |
| 2,449,708 | A | * | 9/1948 | Lindsay | 473/478 |
| 2,525,304 | A | * | 10/1950 | Lindsay | 473/478 |
| 2,816,297 | A | * | 12/1957 | Stanley | 114/351 |
| 2,827,729 | A | * | 3/1958 | Hoene | 43/1 |
| 2,864,388 | A | * | 12/1958 | Oliver | 135/133 |
| 3,032,046 | A | * | 5/1962 | Coonradt | 135/90 |
| 3,161,231 | A | * | 12/1964 | Dawson et al. | 160/132 |
| 4,127,272 | A | * | 11/1978 | Pennell | 473/478 |
| 4,751,936 | A | * | 6/1988 | Zibble et al. | 135/117 |
| 5,431,411 | A | * | 7/1995 | Padilla | 473/416 |
| 5,857,928 | A | * | 1/1999 | Stewart | 473/446 |
| 6,558,279 | B1 | * | 5/2003 | Goldwitz | 473/478 |
| 6,789,557 | B1 | * | 9/2004 | Wahl, Jr. | 135/154 |
| 7,347,217 | B2 | * | 3/2008 | Bree et al. | 135/149 |
| 2001/0009158 | A1 | * | 7/2001 | O'Hare | 135/90 |
| 2002/0112752 | A1 | * | 8/2002 | Blakney | 135/96 |
| 2008/0066794 | A1 | * | 3/2008 | Durfee | 135/96 |
| 2009/0258735 | A1 | * | 10/2009 | Nash | 473/478 |
| 2009/0277487 | A1 | * | 11/2009 | Holacka et al. | 135/154 |
| 2011/0105253 | A1 | * | 5/2011 | Wennesland | 473/478 |
| 2011/0180119 | A1 | * | 7/2011 | Clampitt | 135/88.01 |

\* cited by examiner

*Primary Examiner* — Robert Canfield
(74) *Attorney, Agent, or Firm* — Plager Schack LLP

(57) ABSTRACT

A blind assembly is configured to cover blind area. The blind assembly includes a frame assembly connected to ground near the blind area. A spring assembly is attached to the frame assembly and configured to bias the frame assembly away from the ground. A wire mesh is connected to the frame assembly with zip ties. The wire mesh is configured to support fast grass above the blind area in order to create a blind for a user.

6 Claims, 4 Drawing Sheets

BLIND ASSEMBLY

RELATED APPLICATION

This application claims priority to U.S. provisional patent application Ser. No. 61/883,776 filed on Sep. 27, 2013, the entire contents of which is herein incorporated by reference.

BACKGROUND

The embodiments herein relate generally to temporary concealing structures for hunting.

Prior to embodiments of the disclosed invention, it was difficult to adequately balance plants and other cover over a hunter. Embodiments of the disclosed invention solve these problems.

SUMMARY

A blind assembly is configured to cover blind area. The blind assembly includes a frame assembly connected to ground via stakes near the blind area. A spring assembly is attached to the frame assembly and configured to bias the frame assembly away from the ground. A wire mesh is connected to the frame assembly with zip ties. The wire mesh is configured to support camouflage grass matting such as that sold under the trademark FASTGRASS® above the blind area in order to create a blind for a user.

In some embodiments, the frame assembly can further comprise an upper frame mechanically coupled to a first connector tee and a second connector tee. A first leg can be mechanically coupled to the first connector tee. A second leg can be mechanically coupled to the second connector tee. An outer pivot tube can be connected the first connector tee and the second connector tee. An inner pivot tube can be connected the first connector tee and the second connector tee.

In some embodiments, the frame assembly can further comprise a first upper frame mechanically coupled to a first connector tee that is further mechanically coupled to a first leg and a first outer pivot tube. A second upper frame can be mechanically coupled to a second connector tee that is further mechanically coupled to a second leg and a second outer pivot tube. An upper frame tee can be joined to the first upper frame and the second upper frame. An upper frame center support can be connected to the upper frame tee. A pivot tube tee can be connected to the upper frame center support, the first outer pivot tube and the second outer pivot tube. An inner pivot tube can be connected to the first connector tee and the second connector tee.

In some embodiments, the spring assembly can further comprise a first spring connected to a first cotter pin and a second cotter pin. The first cotter pin can be inserted through a first cotter pin hole in the first connector tee and a first inner pivot tube cotter pin hole in the inner pivot tube. The second cotter pin can be inserted through a second cotter pin hole in the upper frame. A second spring can be connected to a third cotter pin and a fourth cotter pin. The third cotter pin can be inserted through a third cotter pin hole in the second connector tee and a second inner pivot tube cotter pin hole in the inner pivot tube. The fourth cotter pin can be inserted through a fourth cotter pin hole in the upper frame.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
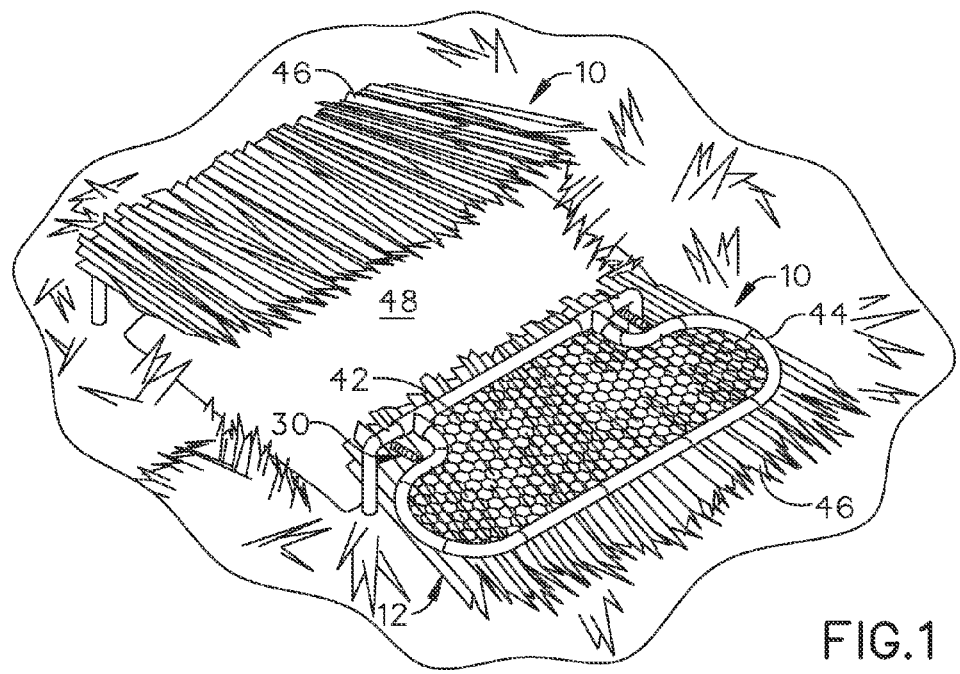
FIG. 1 is a perspective view of an embodiment of the invention, shown in use.

By way of example, and referring to FIG. 1, one embodiment of blind assembly 10 comprises cover frame assembly 12 connected to spring assembly 30. Frame assembly 12 is attached to wire mesh 42 with zip ties 44. Wire mesh 42 is, in turn, covered with camouflage 46. In some embodiments, the wire mesh can be a plastic wire mesh. Spring assembly 30 operates to lift frame assembly 12 and camouflage grass matting 46 above blind area 48. The spring assembly 30 creates tension when positioning the frame assembly 12 and camouflage grass matting 46 over the blind area 48. This tension allows multiple angle adjustments and holds a fixed position at any angle within a 90 degree radius over the blind area 48.

Figure 2:
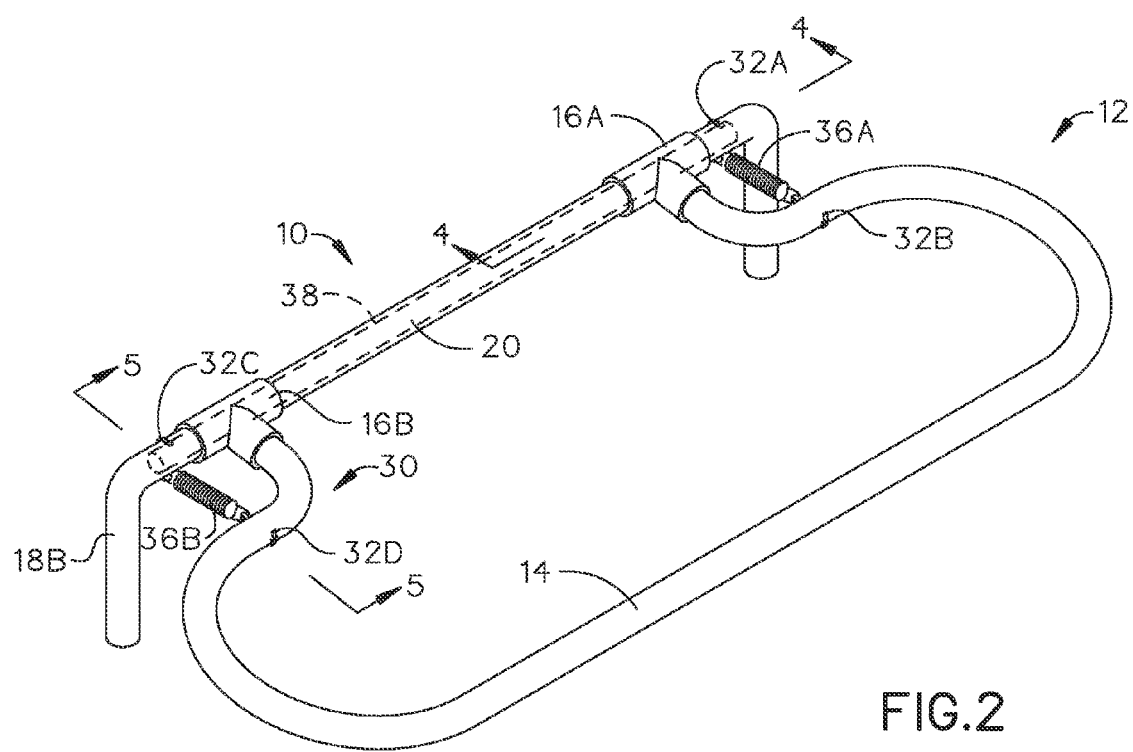
FIG. 2 is a perspective view of an embodiment of the invention, with wire and grass removed for clarity.
Figure 3:
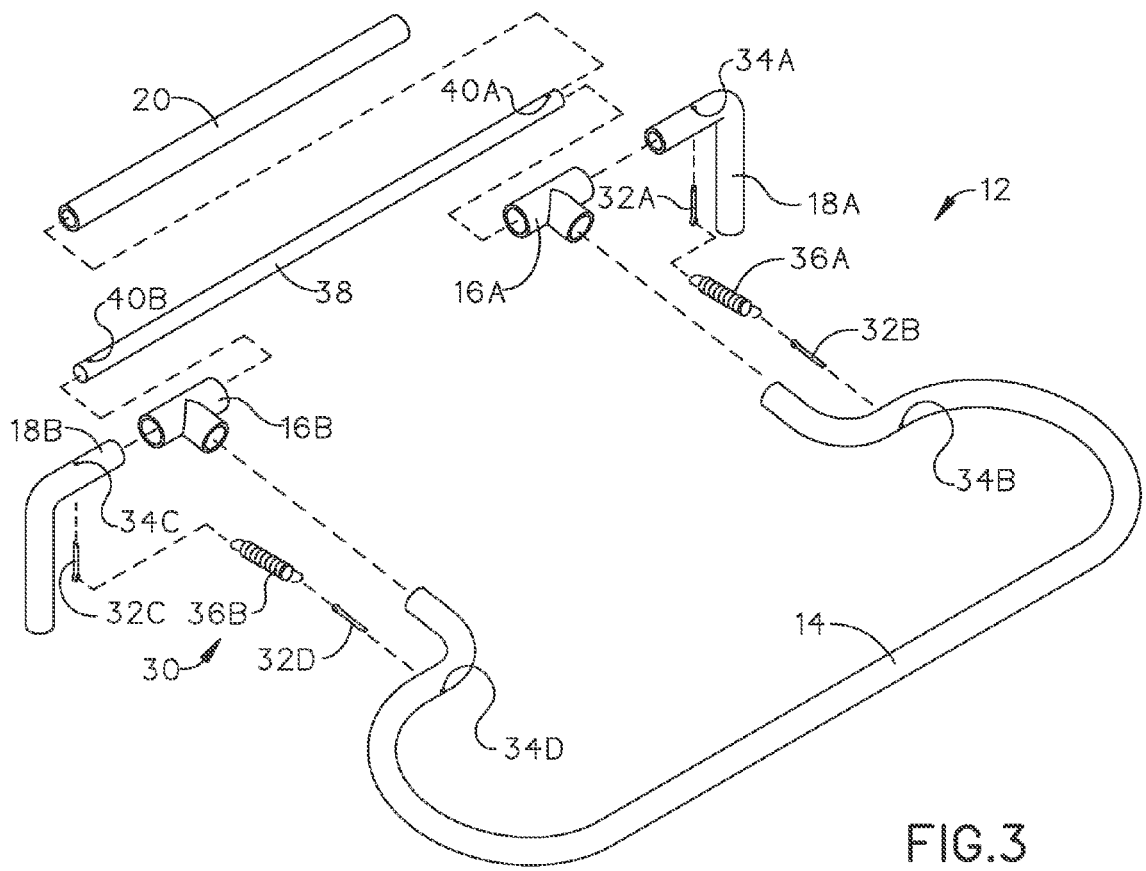
FIG. 3 is an exploded view of an embodiment of the invention.
Figure 4:
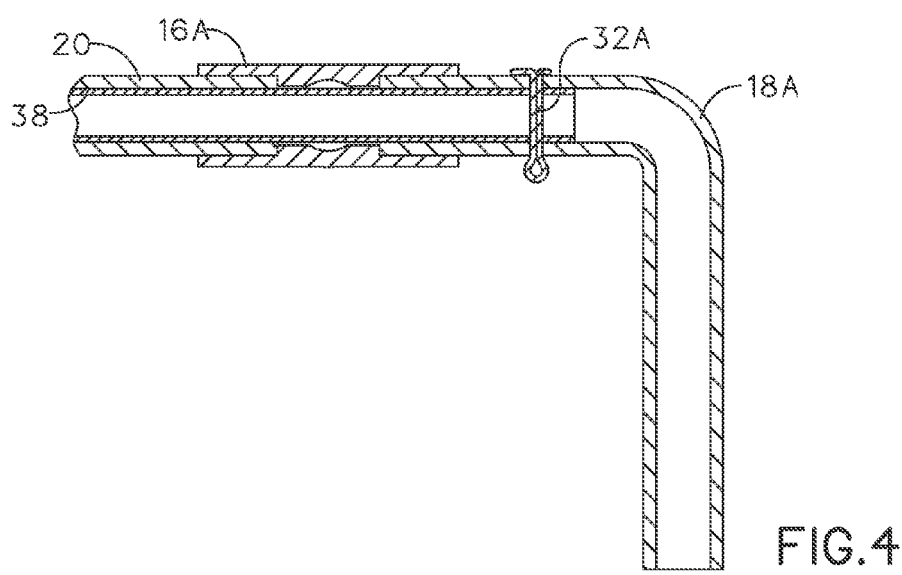
FIG. 4 is a section view of an embodiment of the invention, taken along line 4-4 in FIG. 2.

Turning to FIG. 2, FIG. 3 and FIG. 4, frame assembly 12 further comprises upper frame 14 mechanically coupled to first connector tee 16A and second connector tee 16B. First connector tee 16A is further mechanically coupled to first leg 18A. Likewise, second connector tee 16B is further mechanically coupled to second leg 18B. First connector tee 16A and second connector tee 16B are connected with outer pivot tube 20.

Spring assembly 30 further comprises first cotter pin 32A inserted through first cotter pin hole 34A in first connector tee 16A, and first leg 18A. Second cotter pin 32B, is inserted through second cotter pin hole 34B in upper frame 14. First spring 36A connects first cotter pin 32A to second cotter pin 32B.

Likewise, spring assembly 30 further comprises third cotter pin 32C inserted through third cotter pin hole 34C in third connector tee 18C, second leg 18B. Fourth cotter pin 32D is inserted through fourth cotter pin hole 34D in upper frame 14. Second spring 36B connects third cotter pin 32C to fourth cotter pin 32D.

Inner pivot tube 38 further comprises first inner pivot tube cotter pin hole 40A and second inner pivot tube cotter pin hole 40B. Inner pivot tube 38 fits inside first connector tee 16A, second connector tee 16B, and outer pivot tube 20. First cotter pin 32A fits through first inner pivot tube cotter pin hole 40A. Likewise, third cotter pin 32C fits through second inner pivot tube cotter pin hole 40B.

Figure 5:
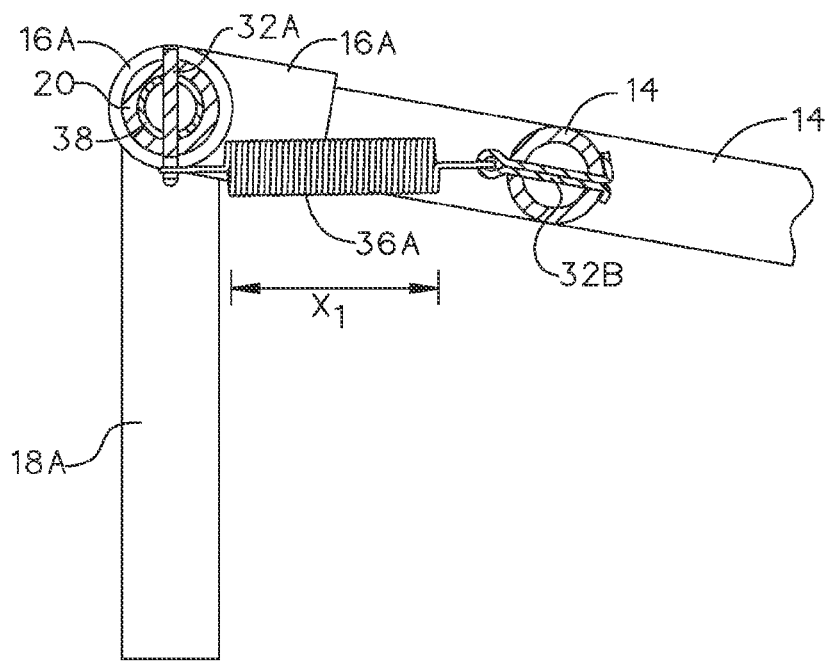
FIG. 5 is a section view of an embodiment of the invention, taken along line 5-5 in FIG. 2.
Figure 6:
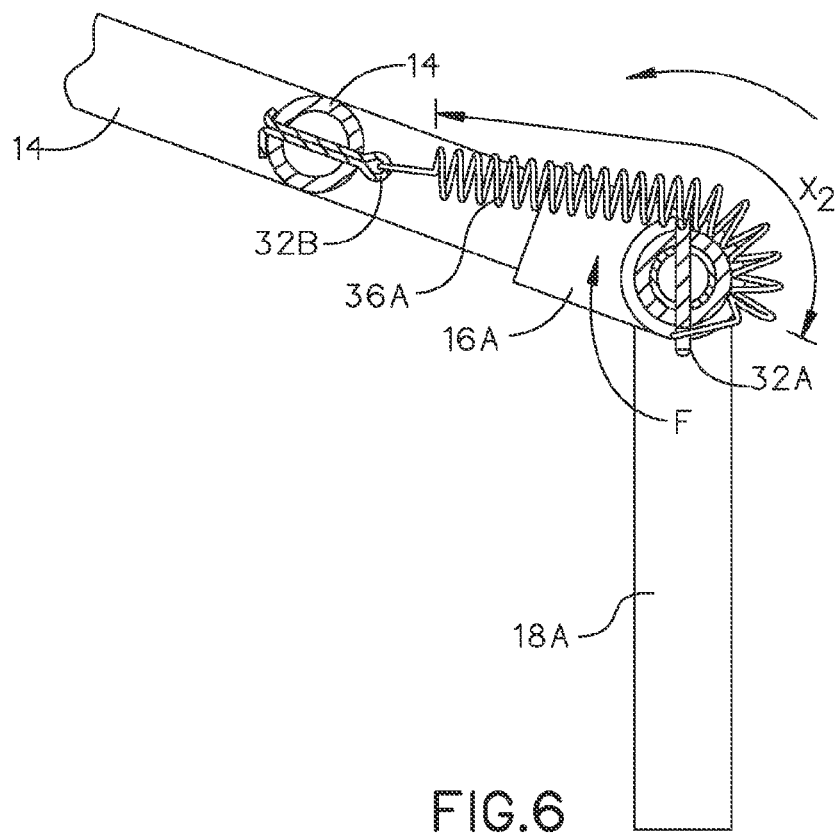
FIG. 6 is a section view of an embodiment of the invention, illustrating the movement of the frame and extension of the spring.

Turning to FIG. 5 and FIG. 6, one of the advantages of the present system is to use spring assembly 30 to hold frame assembly 12 above blind area 48. As upper frame 14 moves from a first side of first leg 18A to a second side of first leg 18A. This causes first spring 36A to expand from first length X1 to second length X2. When expanded, first spring 36A renders spring force F onto upper frame 14 that lifts upper frame 14 from blind area 48. Second spring 36B is arranged likewise but is not shown. Legs 18A and 18B are configured to rest upon stakes that fit inside ½ radius of legs 18A and 18B and driven into the ground proximate blind area 48. The spring assembly 30 creates tension when positioning the frame assembly 12 over the blind area 48. This tension allows multiple angle adjustments and holds a fixed position at any angle within a 90 degree radius over the blind area 48. When slight force F is exhibited against upper frame 14 while in a fixed position, the tension of the spring assembly 30 is released and the frame springs backwards away from the blind area.

Figure 7:
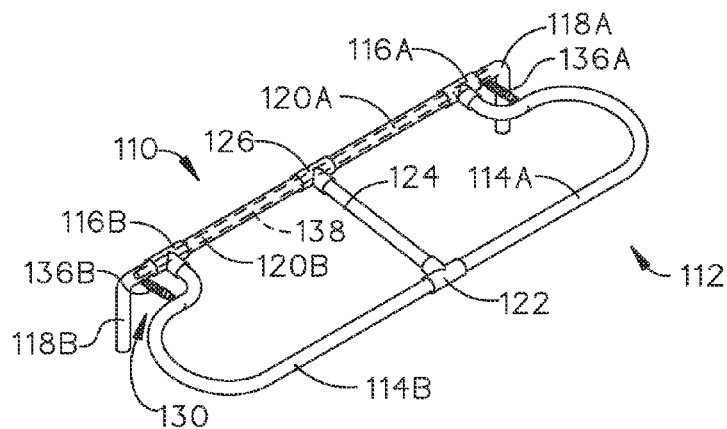
FIG. 7 is a perspective view of an embodiment of the invention.
Figure 8:
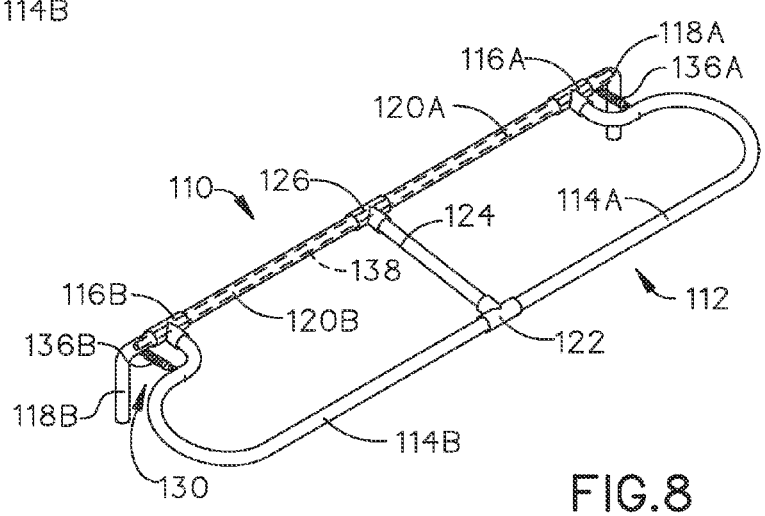
FIG. 8 is a perspective view of an embodiment of the invention.
Figure 9:
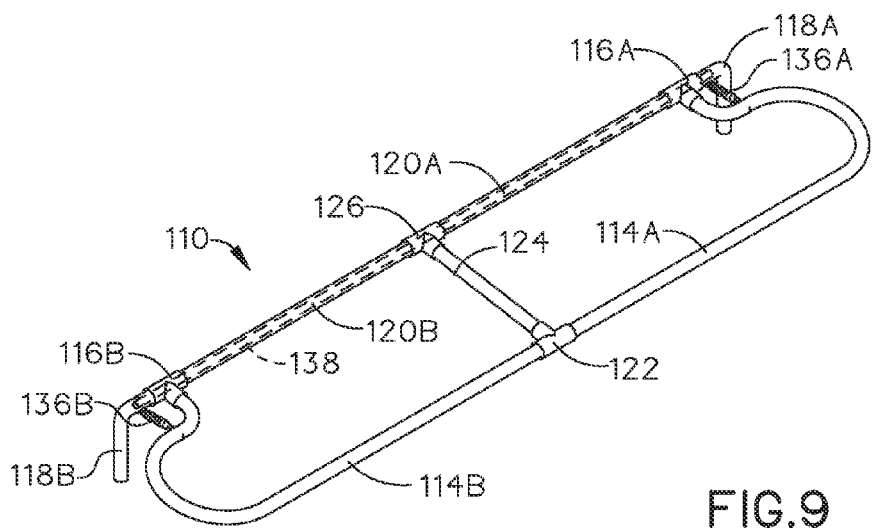
FIG. 9 is a perspective view of an embodiment of the invention.

As shown in FIG. 7, FIG. 8, and FIG. 9, in some cases, additional structural support is necessary for the frame. Blind assembly 110 comprises cover frame assembly 112 connected to spring assembly 130.

Frame assembly 112 comprises first upper frame 114A mechanically coupled to first connector tee 116A. First connector tee 116A is further mechanically coupled to first leg 118A. First connector tee 116A is mechanically coupled to first outer pivot tube 120A.

Likewise, second upper frame 114B is mechanically coupled to second connector tee 116B. Second connector tee 116B is further mechanically coupled to second leg 118B. Second connector tee 116B is mechanically coupled to second outer pivot tube 120B.

First upper frame 114A is joined to second upper frame 114B with upper frame tee 122. Upper frame tee 122 is mechanically coupled to upper frame center support 124. Center support 124 is further mechanically coupled to pivot tube tee 126. Pivot tube tee 126 is further mechanically coupled to first outer pivot tube 120A and second outer pivot tube 120B. First connector tee 116A and second connector tee 116B are connected with inner pivot tube 138.

Spring assembly 130 involves first spring 136A and second spring 136B. These are arranged in a substantially similar matter to first spring 36A and second spring 36B above.

These components can be made of known materials with known material working techniques. For instance, plastics and plastic working, metals and metal working or wood and woodworking may be used. Different arrangements and sizes of parts may be used depending on the size of the blind area 48 desired by the user.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A blind assembly, configured to cover blind area; the blind assembly comprising:
    a frame assembly connected to ground near the blind area;
    a spring assembly, attached to the frame assembly and configured to create tension when positioning the frame assembly over the blind area; where the tension allows for multiple angle adjustments and holds a fixed position at each adjusted angle;
    wire mesh, connected to the frame assembly;
    wherein the wire mesh is configured to support grass matting above the blind area in order to create a blind for a user.

2. The blind assembly of claim 1, wherein the frame assembly further comprises:
    an upper frame mechanically coupled to a first connector tee and a second connector tee;
    a first leg, mechanically coupled to the first connector tee;
    a second leg, mechanically coupled to the second connector tee;
    an outer pivot tube, connected the first connector tee and the second connector tee; and
    an inner pivot tube, connected the first connector leg and the second connector leg.

3. The blind assembly of claim 2, wherein the spring assembly further comprises:
    a first spring connected to a first cotter pin and a second cotter pin;
    wherein the first cotter pin is inserted through a first cotter pin hole in the first connector leg and a first inner pivot tube cotter pin hole in the inner pivot tube;
    wherein the second cotter pin is inserted through a second cotter pin hole in the upper frame;
    a second spring connected to a third cotter pin and a fourth cotter pin;
    wherein the third cotter pin is inserted through a third cotter pin hole in the second connector leg and a second inner pivot tube cotter pin hole in the inner pivot tube;
    wherein the fourth cotter pin is inserted through a fourth cotter pin hole in the upper frame.

4. The blind assembly of claim 1, wherein the frame assembly further comprises:
    a first upper frame mechanically coupled to a first connector tee that is further mechanically coupled to a first leg and a first outer pivot tube;
    a second upper frame mechanically coupled to a second connector tee that is further mechanically coupled to a second leg and a second outer pivot tube;
    an upper frame tee, joined to the first upper frame and the second upper frame;
    an upper frame center support, connected to the upper frame tee;
    a pivot tube tee, connected to the upper frame center support, the first outer pivot tube and the second outer pivot tube; and
    an inner pivot tube, connected to the first connector tee and the second connector tee.

5. A blind assembly, configured to cover blind area; the blind assembly comprising:
    a frame assembly connected to ground near the blind area;
    a spring assembly, attached to the frame assembly and configured to bias the frame assembly away from the ground;
    wire mesh, connected to the frame assembly;
    wherein the wire mesh is configured to support grass matting above the blind area in order to create a blind for a user;
    an upper frame mechanically coupled to a first connector tee and a second connector tee;
    a first leg, mechanically coupled to the first connector tee;
    a second leg, mechanically coupled to the second connector tee;
    an outer pivot tube, connected the first connector tee and the second connector tee; and
    an inner pivot tube, connected the first connector leg and the second connector leg.

6. The blind assembly of claim 5, wherein the spring assembly further comprises:
    a first spring connected to a first cotter pin and a second cotter pin;

wherein the first cotter pin is inserted through a first cotter pin hole in the first connector leg and a first inner pivot tube cotter pin hole in the inner pivot tube;

wherein the second cotter pin is inserted through a second cotter pin hole in the upper frame;

a second spring connected to a third cotter pin and a fourth cotter pin;

wherein the third cotter pin is inserted through a third cotter pin hole in the second connector leg and a second inner pivot tube cotter pin hole in the inner pivot tube;

wherein the fourth cotter pin is inserted through a fourth cotter pin hole in the upper frame.

* * * * *